(12) United States Patent
Dharmarajan et al.

(10) Patent No.: US 7,951,732 B2
(45) Date of Patent: May 31, 2011

(54) ELASTOMERIC LAMINATES FOR CONSUMER PRODUCTS

(75) Inventors: Narayanaswami Raja Dharmarajan, Houston, TX (US); Monica Gonzalez Correa, Houston, TX (US); Vincent Bernard Benoît Ghislain Gallez, Louvain la Neuve (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 654 days.

(21) Appl. No.: 11/698,435

(22) Filed: Jan. 26, 2007

(65) Prior Publication Data

US 2008/0182116 A1    Jul. 31, 2008

(51) Int. Cl.
B32B 27/12    (2006.01)
B32B 27/32    (2006.01)

(52) U.S. Cl. ......... 442/394; 442/328; 442/382; 442/398

(58) Field of Classification Search .................. 442/328, 442/382, 394, 398
See application file for complete search history.

(56) References Cited

U.S. PATENT DOCUMENTS

| | | | |
|---|---|---|---|
| 4,472,485 A | 9/1984 | Tabuse et al. ................. 428/516 |
| 4,540,753 A | 9/1985 | Cozewith et al. | |
| 4,820,142 A | 4/1989 | Balk | |
| 5,108,820 A | 4/1992 | Kaneko et al. | |
| 5,336,552 A | 8/1994 | Strack et al. | |
| 5,382,400 A | 1/1995 | Pike et al. | |
| 5,393,599 A | 2/1995 | Quantrille et al. ............. 428/284 |
| 5,418,045 A | 5/1995 | Pike et al. ...................... 428/198 |
| 5,504,172 A | 4/1996 | Imuta et al. | |
| 5,667,902 A | 9/1997 | Brew et al. | |
| 5,733,617 A | 3/1998 | Baduel .......................... 428/36.8 |
| 5,840,412 A | 11/1998 | Wood et al. .................... 428/284 |
| 5,914,184 A | 6/1999 | Morman ..................... 428/315.9 |
| 6,015,764 A | 1/2000 | McCormack et al. ........ 442/370 |
| 6,017,615 A | 1/2000 | Thakker et al. | |
| 6,103,647 A * | 8/2000 | Shultz et al. ................... 442/346 |
| 6,148,817 A | 11/2000 | Bryant et al. ............. 128/207.11 |
| 6,342,565 B1 | 1/2002 | Cheng et al. | |
| 6,516,472 B2 | 2/2003 | Gessner et al. .................... 2/111 |
| 6,525,157 B2 | 2/2003 | Cozewith et al. | |
| 6,531,207 B1 | 3/2003 | Eaton et al. .................... 428/198 |
| 6,559,262 B1 | 5/2003 | Waymouth et al. | |
| 6,770,713 B2 | 8/2004 | Hanke et al. | |
| 6,881,800 B2 | 4/2005 | Friedersdorf | |
| 7,319,077 B2 | 1/2008 | Mehta et al. | |
| 2004/0087235 A1 | 5/2004 | Morman et al. .............. 442/394 |
| 2004/0236042 A1 | 11/2004 | Datta et al. | |
| 2005/0096623 A1 | 5/2005 | Nhan et al. ................ 604/385.22 |
| 2005/0106978 A1 | 5/2005 | Cheng et al. | |
| 2005/0130544 A1 | 6/2005 | Cheng et al. | |
| 2005/0215964 A1 | 9/2005 | Autran et al. | |
| 2008/0108268 A1 * | 5/2008 | Little et al. ..................... 442/394 |
| 2008/0172840 A1 | 7/2008 | Kacker et al. | |
| 2008/0182116 A1 | 7/2008 | Dharmarajan et al. | |
| 2008/0182940 A1 | 7/2008 | Dharmarajan et al. | |

FOREIGN PATENT DOCUMENTS

| | | |
|---|---|---|
| EP | 0 374 695 | 6/1990 |
| EP | 1 017 729 | 7/2000 |
| EP | 1 070 087 | 1/2001 |
| EP | 1 233 191 | 8/2002 |
| EP | 1 177 337 | 2/2005 |
| EP | 1 614 699 | 1/2006 |
| EP | 1 712 351 | 10/2006 |
| WO | 01/43969 | 6/2001 |
| WO | WO 02/36651 | 5/2002 |
| WO | WO 03/040095 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | 2005/019515 | 3/2005 |
| WO | WO 2005/049672 | 6/2005 |

OTHER PUBLICATIONS

Inventors: Dharmarajan et al., entitled "Elastomeric Non-Wovens", filed Jan. 26, 2007.
Cheng, H. N., "$^{13}$C NMR Analysis of Ethylene-Propylene Rubbers," Macromolecules, vol. 17, pp. 1950-1955 (1984).
Rodriguez, F., Principles of Polymer Systems $3^{rd}$ Ed., Hemisphere Pub. Corp., NY, pp. 155-160 (1989).
Slade, P. E. Ed., "Gel Permeation Chromatography," Chap 6, Polymer Molecular Weights Part II, Marcel Dekker, Inc., NY, pp. 287-368 (1975).
Ver Strate et al., "Near Monodisperse Ethylene-Propylene Copolymers by Direct Ziegler-Natta Polymerization. Preparation, Characterization, Properties," Macromolecules, vol. 21, pp. 3360-3371 (1988).
Wheeler et al., "Gel Permeation Chromatography/Fourier Transform Infrared Interface for Polymer Analysis," Applied Spectroscopy, vol. 47, No. 8, pp. 1128-1130 (1993).

* cited by examiner

*Primary Examiner* — Norca L Torres-Velazquez
(74) *Attorney, Agent, or Firm* — Kevin M. Faulkner

(57) ABSTRACT

Elastic laminates and articles for manufacture are provided. The elastic laminate can include one or more facing layers comprising one or more thermoplastic resins and one or more propylene-based polymers, and one or more inner layers comprising one or more propylene-based polymers. Each facing layer can include at least 50% by weight of the one or more propylene-based polymers where the propylene-based polymer has (i) 60 wt % or more units derived from propylene, (ii) isotactically arranged propylene derived sequences, and (iii) a heat of fusion less than 45 J/g.

20 Claims, No Drawings

ELASTOMERIC LAMINATES FOR CONSUMER PRODUCTS

BACKGROUND OF THE INVENTION

1. Field of the Invention

Embodiments of the present invention generally relate to propylene-based polymers for making articles, such as films and fabrics.

2. Description of the Related Art

Materials with good stretchability and elasticity are used to manufacture a variety of disposable articles in addition to durable articles including incontinence pads, disposable diapers, training pants, clothing, undergarments, sports apparel, automotive trim, weather-stripping, gaskets, and furniture upholstery. For clothing, stretchability and elasticity are performance attributes that allow the materials to provide a closely conforming fit to the body of the wearer. Various types of elastic laminates have been used for such materials.

Elastic laminates, especially those used as diaper waist bands, leg cuffs, and elastic stretch engines, have been constructed from an elastic film as an inner layer with an inelastic member as the facing layer. The facing layer is intended to contact the wearer or user. Examples of elastic laminates include an inner layer of an elastic styrenic block copolymer (SBC) compound laminated between facing layers of inelastic polypropylene (PP) nonwoven. The SBC layer is relatively incompatible with the PP facing layer. As such, an adhesive tie layer resin is used to provide a good bond between the facing layer and the elastic layer. However, adhesive tie layers increase the complexity of the lamination process and add overall cost to the production process.

There is a need, therefore, for an elastic laminate having good stretchability and elasticity constructed from compatible inner and facing layers that do not require an adhesive tie layer therebetween.

SUMMARY OF THE INVENTION

Elastic laminates and articles for manufacture are provided. In at least one specific embodiment, the elastic laminate comprises one or more facing layers comprising one or more thermoplastic resins and one or more propylene-based polymers, wherein the facing layers each comprise at least 50% by weight of the one or more propylene-based polymers; and one or more inner layers comprising one or more propylene-based polymers, wherein each propylene-based polymer has (i) 60 wt % or more units derived from propylene, (ii) isotactically arranged propylene derived sequences, and (iii) a heat of fusion less than 45 J/g.

In at least one other specific embodiment, the elastic laminate comprises an inner layer at least partially disposed between two or more facing layers, each layer comprising at least 50% by weight of one or more propylene-based polymers having (i) 60 wt % or more units derived from propylene, (ii) isotactically arranged propylene derived sequences, and (iii) a heat of fusion less than 45 J/g., wherein at least one of the two or more facing layers further comprises one or more one thermoplastic resins.

In at least one specific embodiment, the article for manufacture comprises an elastic laminate having one or more facing layers disposed at least partially about one or more inner layers, wherein the facing layers and inner layers each comprise at least 50% by weight of one or more propylene-based polymers having (i) 60 wt % or more units derived from propylene, (ii) isotactically arranged propylene derived sequences, and (iii) a heat of fusion less than 45 J/g.

DETAILED DESCRIPTION

A detailed description will now be provided. Depending on the context, all references below to the "invention" can in some cases refer to certain specific embodiments only. In other cases it will be recognized that references to the "invention" will refer to subject matter recited in one or more, but not necessarily all, of the claims.

Facing Layer

In one or more embodiments, the elastic laminate includes one or more facing layers that are elastic or semi-elastic and one or more inner layers. The elastic contribution of the facing layer enhances the overall elastic performance of the laminate. Furthermore, the elastic or semi-elastic facing layer reduces the need for a highly elastic inner, thereby offering a wider selection of inner materials.

As used herein, the terms "elastic" and "semi-elastic" refer to any material having a tension set of 80% or less, or 60% or less, or 50% or less, or 25% or less, at 100% elongation at a temperature between the glass transition temperature and the crystalline melting point. Elastic polymer materials and compositions are also referred to in the art as "elastomers" and "elastomeric."

In one or more embodiments, the facing layer includes one or more propylene-based polymers. In one or more embodiments, the facing layer includes a blend of one or more propylene-based polymers and one or more thermoplastic resins. In one or more embodiments, the one or more facing layers include at least 60 wt % of a propylene-based elastomer. The one or more facing layers can include at least 70 wt % of a propylene-based elastomer. The one or more facing layers can include at least 80 wt % of a propylene-based elastomer. The one or more facing layers can include at least 90 wt % of a propylene-based elastomer. The one or more facing layers can include at least 95 wt % of a propylene-based elastomer.

Inner Layer

In one or more embodiments, the one or more inner layers are disposed at least partially between the one or more facing layers. Because the one or more facing layers are constructed from one or more elastic or semi-elastic materials, the overall elastic performance of the elastic laminate is enhanced and therefore, reduces the need for a highly elastic inner layer. Preferably, the one or more inner layers include one or more propylene-based polymers. The one or more inner layers can also include a blend of one or more propylene-based polymers and one or more thermoplastic resins.

Propylene-Based Polymer

The propylene-based polymer can be propylene-α-olefin copolymers, propylene-α-olefin-diene terpolymers, or propylene-diene copolymers. For simplicity and ease of description, however, the term "propylene-based polymer" as used herein refers to propylene-α-olefin copolymers, propylene-α-olefin-diene terpolymers, and propylene-diene copolymers.

The propylene-based polymer can be prepared by polymerizing propylene with one or more comonomers. In at least one embodiment, the propylene-based polymer can be prepared by polymerizing propylene with one or more $C_2$ and/or $C_4$-$C_8$ α-olefin. In at least one other specific embodiment, the propylene-based polymer can be prepared by polymerizing propylene with one or more dienes. In at least one other specific embodiment, the propylene-based polymer can be prepared by polymerizing propylene with ethylene and/or at least one $C_4$-$C_{20}$ α-olefin, or a combination of ethylene and/or at least one $C_4$-$C_{20}$ α-olefin and one or more dienes. The one or more dienes can be conjugated or non-conjugated. Preferably, the one or more dienes are non-conjugated.

The comonomers can be linear or branched. Preferred linear comonomers include ethylene or $C_4$ to $C_8$ α-olefins, more preferably ethylene, 1-butene, 1-hexene, and 1-octene, even more preferably ethylene or 1-butene. Preferred branched comonomers include 4-methyl-1-pentene, 3-methyl-1-pentene, and 3,5,5-trimethyl-1-hexene. In one or more embodiments, the comonomer can include styrene.

Illustrative dienes can include but are not limited to 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD), and combinations thereof. Preferably, the diene is ENB.

Preferred methods and catalysts for producing the propylene-based polymers are found in publications US 2004/0236042 and WO 05/049672 and in U.S. Pat. No. 6,881,800, which are all incorporated by reference herein. Pyridine amine complexes, such as those described in WO03/040201 are also useful to produce the propylene-based polymers useful herein. The catalyst can involve a fluxional complex, which undergoes periodic intra-molecular re-arrangement so as to provide the desired interruption of stereoregularity as in U.S. Pat. No. 6,559,262. The catalyst can be a stereorigid complex with mixed influence on propylene insertion, see Rieger EP1070087. The catalyst described in EP1614699 could also be used for the production of backbones suitable for the invention.

The propylene-based polymer can have an average propylene content on a weight percent basis of from about 60 wt % to about 99.7 wt %, more preferably from about 60 wt % to about 99.5 wt %, more preferably from about 60 wt % to about 97 wt %, more preferably from about 60 wt % to about 95 wt % based on the weight of the polymer. In one embodiment, the balance comprises a $C_2$ and/or $C_4$-$C_8$ α-olefin. In another embodiment, the balance comprises diene. In another embodiment, the balance comprises one or more dienes and one or more of the α-olefins described previously. Other preferred ranges are from about 80 wt % to about 95 wt % propylene, more preferably from about 83 wt % to about 95 wt % propylene, more preferably from about 84 wt % to about 95 wt % propylene, and more preferably from about 84 wt % to about 94 wt % propylene based on the weight of the polymer. The balance of the propylene-based polymer comprises a diene and optionally, one or more alpha-olefins. In one or more embodiments above or elsewhere herein, the alpha-olefin is butene, hexene or octene. In other embodiments, two alpha-olefins are present, preferably ethylene and one of butene, hexene or octene.

Preferably, the propylene-based polymer comprises about 0.3 wt % to about 24 wt %, of a non-conjugated diene based on the weight of the polymer, more preferably from about 0.5 wt % to about 12 wt %, more preferably about 0.6 wt % to about 8 wt %, and more preferably about 0.7 wt % to about 5 wt %. In other embodiments, the diene content ranges from about 0.3 wt % to about 10 wt %, more preferably from about 0.3 to about 5 wt %, more preferably from about 0.3 wt % to about 4 wt %, preferably from about 0.3 wt % to about 3.5 wt %, preferably from about 0.3 wt % to about 3.0 wt %, and preferably from about 0.3 wt % to about 2.5 wt % based on the weight of the polymer. In one or more embodiments above or elsewhere herein, the propylene-based polymer comprises ENB in an amount of from about 0.5 to about 4 wt %, more preferably from about 0.5 to about 2.5 wt %, and more preferably from about 0.5 to about 2.0 wt %.

In other embodiments, the propylene-based polymer comprises propylene and diene in one or more of the ranges described above with the balance comprising one or more $C_2$ and/or $C_4$-$C_{20}$ olefins. In general, this will amount to the propylene-based polymer preferably comprising from about 5 to about 40 wt % of one or more $C_2$ and/or $C_4$-$C_{20}$ olefins based the weight of the polymer. When $C_2$ and/or a $C_4$-$C_{20}$ olefins are present the combined amounts of these olefins in the polymer is preferably at least about 5 wt % and falling within the ranges described herein. Other preferred ranges for the one or more α-olefins include from about 5 wt % to about 35 wt %, more preferably from about 5 wt % to about 30 wt %, more preferably from about 5 wt % to about 25 wt %, more preferably from about 5 wt % to about 20 wt %, more preferably from about 5 to about 17 wt % and more preferably from about 5 wt % to about 16 wt %.

The propylene-based polymer can have a weight average molecular weight (Mw) of about 5,000,000 or less, a number average molecular weight (Mn) of about 3,000,000 or less, a z-average molecular weight (Mz) of about 10,000,000 or less, and a g' index of 0.95 or greater measured at the weight average molecular weight (Mw) of the polymer using isotactic polypropylene as the baseline, all of which can be determined by size exclusion chromatography, e.g., 3D SEC, also referred to as GPC-3D as described herein.

In one or more embodiments above or elsewhere herein, the propylene-based polymer can have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 400,000, wherein Mw is determined as described herein.

In one or more embodiments above or elsewhere herein, the propylene-based polymer can have a Mn of about 2,500 to about 2,500,000 g/mole, more preferably a Mn of about 5,000 to about 500,000, more preferably a Mn of about 10,000 to about 250,000, more preferably a Mn of about 25,000 to about 200,000, wherein Mn is determined as described herein.

In one or more embodiments above or elsewhere herein, the propylene-based polymer can have a Mz of about 10,000 to about 7,000,000 g/mole, more preferably a Mz of about 50,000 to about 1,000,000, more preferably a Mz of about 80,000 to about 700,000, more preferably a Mz of about 100,000 to about 500,000, wherein Mz is determined as described herein.

The molecular weight distribution index (MWD=(Mw/Mn)), sometimes referred to as a "polydispersity index" (PDI), of the propylene-based polymer can be about 1.5 to 40. In an embodiment the MWD can have an upper limit of 40, or 20, or 10, or 5, or 4.5, and a lower limit of 1.5, or 1.8, or 2.0. In one or more embodiments above or elsewhere herein, the MWD of the propylene-based polymer is about 1.8 to 5 and most preferably about 1.8 to 3. Techniques for determining the molecular weight (Mn and Mw) and molecular weight distribution (MWD) can be found in U.S. Pat. No. 4,540,753 (Cozewith, Ju and Verstrate) (which is incorporated by reference herein for purposes of U.S. practices) and references cited therein, in Macromolecules, 1988, volume 21, p 3360 (Verstrate et al.), which is herein incorporated by reference for purposes of U.S. practice, and references cited therein, and in accordance with the procedures disclosed in U.S. Pat. No. 6,525,157, column 5, lines 1-44, which patent is hereby incorporated by reference in its entirety.

In one or more embodiments above or elsewhere herein, the propylene-based polymer can have a g' index value of 0.95 or greater, preferably at least 0.98, with at least 0.99 being more preferred, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the propylene-based polymer and $\eta_l$ is the intrinsic viscosity of a linear polymer of the same viscosity-averaged molecular weight ($M_v$) as the propylene-based polymer. $\eta_l = KM_v^\alpha$, K and α are measured values for linear polymers and should be obtained on the same instrument as the one used for the g' index measurement.

In one or more embodiments above or elsewhere herein, the propylene-based polymer can have a density of about 0.85 g/cm³ to about 0.92 g/cm³, more preferably, about 0.87 g/cm³ to 0.90 g/cm³, more preferably about 0.88 g/cm³ to about 0.89 g/cm³ at room temperature as measured per ASTM D-1505.

In one or more embodiments above or elsewhere herein, the propylene-based polymer can have a melt flow rate (MFR, 2.16 kg weight @ 230° C.), equal to or greater than 0.2 g/10 min as measured according to ASTM D-1238(A) as modified (described below). Preferably, the MFR (2.16 kg @ 230° C.) is from about 0.5 g/10 min to about 200 g/10 min and more preferably from about 1 g/10 min to about 100 g/10 min. In an embodiment, the propylene-based polymer has an MFR of from about 0.5 g/10 min to about 200 g/10 min, especially from about 2 g/10 min to about 30 g/10 min, more preferably from about 5 g/10 min to about 30 b/10 min, more preferably from about 10 g/10 min to about 30 g/10 min or more specially from about 10 g/10 min to about 25 g/10 min.

The propylene-based polymer can have a Mooney viscosity, ML (1+4)@ 125° C., as determined according to ASTM D1646, of less than 100, more preferably less than 75, even more preferably less than 60, and most preferably less than 30.

In one or more embodiments above or elsewhere herein, the propylene-based polymer can have a heat of fusion (Hf) determined according to the DSC procedure described later, which is greater than or equal to about 0.5 Joules per gram (J/g), and is ≦about 80 J/g, preferably ≦about 75 J/g, preferably ≦about 70 J/g, more preferably ≦about 60 J/g, more preferably ≦about 50 J/g, more preferably ≦about 45 J/g, more preferably ≦about 35 J/g. Also preferably, the propylene-based polymer has a heat of fusion that is greater than or equal to about 1 J/g, preferably greater than or equal to about 5 J/g. In another embodiment, the propylene-based polymer can have a heat of fusion (Hf), which is from about 0.5 J/g to about 75 J/g, preferably from about 1 J/g to about 75 J/g, more preferably from about 0.5 J/g to about 35 J/g. Preferred propylene-based polymers and compositions can be characterized in terms of both their melting points (TM) and heats of fusion, which properties can be influenced by the presence of comonomers or steric irregularities that hinder the formation of crystallites by the polymer chains. In one or more embodiments, the heat of fusion ranges from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, or 45 J/g, or 50 J/g, or 60 J/g or 70 J/g, or 75 J/g, or 80 J/g.

The crystallinity of the propylene-based polymer can also be expressed in terms of percentage of crystallinity (i.e. % crystallinity). In one or more embodiments above or elsewhere herein, the propylene-based polymer has a % crystallinity of from 0.5% to 40%, preferably 1% to 30%, more preferably 5% to 25% wherein % crystallinity is determined according to the DSC procedure described below. In another embodiment, the propylene-based polymer preferably has a crystallinity of less than 40%, preferably about 0.25% to about 25%, more preferably from about 0.5 to about 22%, and most preferably from about 0.5% to about 20%. As disclosed above, the thermal energy for the highest order of polypropylene is estimated at 189 J/g (i.e., 100% crystallinity is equal to 189 J/g.).

In addition to this level of crystallinity, the propylene-based polymer preferably has a single broad melting transition. However, the propylene-based polymer can show secondary melting peaks adjacent to the principal peak, but for purposes herein, such secondary melting peaks are considered together as a single melting point, with the highest of these peaks (relative to a baseline as described herein) being considered the melting point of the propylene-based polymer.

The propylene-based polymer preferably has a melting point (measured by DSC) of equal to or less than 105° C., preferably less than 100° C., preferably less than 90° C., preferably less than 80° C., more preferably less than or equal to 75° C., preferably from about 25° C. to about 80° C., preferably about 25° C. to about 75° C., more preferably about 30° C. to about 65° C.

The Differential Scanning Calorimetry (DSC) procedure can be used to determine heat of fusion and melting temperature of the propylene-based polymer. The method is as follows: About 6 to 10 mg of a sheet of the polymer pressed at approximately 200° C. to 230° C. and allowed to cool by hanging in air under ambient conditions, is removed with a punch die and annealed at room temperature for 48 hours. At the end of this period, the sample is placed in a Differential Scanning Calorimeter (Perkin Elmer Pyris 1 Thermal Analysis System) and cooled to about −50° C. to −70° C. The sample is heated at about 20° C./min to attain a final temperature of about 180° C. to 200° C. The term "melting point," as used herein, is the highest peak among principal and secondary melting peaks as determined by DSC, discussed above. The thermal output is recorded as the area under the melting peak of the sample, which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption relative to a baseline measurement within the range of melting of the sample.

The propylene-based polymer can have a triad tacticity of three propylene units, as measured by $^{13}$C NMR, of 75% or greater, 80% or greater, 82% or greater, 85% or greater, or 90% or greater. Preferred ranges include from about 50 to about 99%, more preferably from about 60 to about 99%, more preferably from 75 to about 99% and more preferably from about 80 to about 99%; and in other embodiments from about 60 to about 97%. Triad tacticity is determined by the methods described in U.S. Patent Application Publication 20040236042.

In one or more embodiments above or elsewhere herein, the propylene-based polymer can be a blend of discrete random propylene-based polymers. Such blends can include ethylene-based polymers and propylene-based polymers, or at least one of each such ethylene-based polymers and propylene-based polymers. The number of propylene-based polymers can be three or less, more preferably two or less.

In one or more embodiments above or elsewhere herein, the propylene-based polymer can include a blend of two propylene-based polymers differing in the olefin content, the diene content, or both.

In one or more embodiments above or elsewhere herein, the propylene-based polymer can include a propylene based elastomeric polymer produced by random polymerization processes leading to polymers having randomly distributed irregularities in stereoregular propylene propagation. This is in contrast to block copolymers in which constituent parts of the same polymer chains are separately and sequentially polymerized.

In another embodiment, the propylene-based polymers can include copolymers prepared according the procedures in WO 02/36651. Likewise, the propylene-based polymer can include polymers consistent with those described in WO 03/040201, WO 03/040202, WO 03/040095, WO 03/040201, WO 03/040233, and/or WO 03/040442. Additionally, the propylene-based polymer can include polymers consistent with those described in EP 1 233 191, and U.S. Pat. No. 6,525,157, along with suitable propylene homo- and copolymers described in U.S. Pat. No. 6,770,713 and U.S. Patent Application Publication 2005/215964, all of which are incorporated by reference. The propylene-based polymer can also include one or more polymers consistent with those described in EP 1 614 699 or EP 1 017 729.

In one or more embodiments above or elsewhere herein, the propylene-based polymer can be or include a blend of two or more propylene-based polymers differing in MFR. For example, the propylene-based polymer can be or include a blend having a first propylene-based polymer having a MFR less than about 5 g/10 min and a second propylene-based polymer having a MFR greater than about 20 g/10 min. In one or more embodiments, the blend the first propylene-based polymer can have a MFR less than about 10 g/10 min, or less than about 15 g/10 min, or less than about 20 g/10 min and the second propylene-based polymer can a MFR greater than about 15 g/10 min, or greater than about 20 g/10 min, or greater than about 30 g/10 min.

Grafted (Functionalized) Backbone

In one or more embodiments, the propylene-based polymer can be grafted (i.e. "functionalized") using one or more grafting monomers. As used herein, the term "grafting" denotes covalent bonding of the grafting monomer to a polymer chain of the propylene-based polymer.

Preferably, the grafting monomer is at least one ethylenically unsaturated carboxylic acid or acid derivative, such as an acid anhydride, ester, salt, amide, imide, acrylates or the like. Illustrative monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo (2.2.1)heptene-2,3-dicarboxylic acid anhydride, maleopimaric acid, tetrahydrophtalic anhydride, norbornene-2,3-dicarboxylic acid anhydride, nadic anhydride, methyl nadic anhydride, himic anhydride, methyl himic anhydride, and x-methylbicyclo(2.2.1)heptene-2,3- dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer.

In one or more embodiments, the grafted propylene based polymer includes from about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment wherein the graft monomer is maleic anhydride, the maleic anhydride concentration in the grafted polymer is preferably in the range of about 0.1 to about 6 wt. %, preferably at least about 0.5 wt. % and highly preferably about 1.5 wt. %.

Styrene and derivatives thereof such as paramethyl styrene, or other higher alkyl substituted styrenes such as t-butyl styrene can be used as a charge transfer agent in presence of the grafting monomer to inhibit chain scission. This allows further minimization of the beta scission reaction and the production of a higher molecular weight grafted polymer.

Preparing Grafted Propylene-Based Polymers

The grafted propylene-based polymer can be prepared using conventional techniques. For example, the graft polymer can be prepared in solution, in a fluidized bed reactor, or by melt grafting. A preferred grafted polymer can be prepared by melt blending in a shear-imparting reactor, such as an extruder reactor. Single screw but preferably twin screw extruder reactors such as co-rotating intermeshing extruders or counter-rotating non-intermeshing extruders but also co-kneaders such as those sold by Buss are especially preferred.

In one or more embodiments, the grafted polymer can be prepared by melt blending the ungrafted propylene-based polymer with a free radical generating catalyst, such as a peroxide initiator, in the presence of the grafting monomer. The preferred sequence for the grafting reaction includes melting the propylene-based polymer, adding and dispersing the grafting monomer, introducing the peroxide, and venting the unreacted monomer and by-products resulting from decomposition of the peroxide. Other sequences can include feeding the monomers and the peroxide pre-dissolved in a solvent.

Illustrative peroxide initiators include but are not limited to: diacyl peroxides such as benzoyl peroxide; peroxyesters such as tert-butyl peroxy benzoate, tert-butylperoxy acetate, 00-tert-butyl-0-(2-ethylhexyl)monoperoxy carbonate; peroxyketals such as n-butyl-4,4-di-(tert-butyl peroxy) valerate; and dialkyl peroxides such as 1,1-bis(tertbutylperoxy) cyclohexane, 1,1-bis(tert-butylperoxy)-3,3,5-trimethylcyclohexane, 2,2-bis(tert-butylperoxy)butane, dicumylperoxide, tert-butylcumylperoxide, Di-(2-tert-butylperoxy-isopropyl-(2)) benzene, di-tert-butylperoxide (DTBP), 2,5-dimethyl-2,5-di (tert-butylperoxy)-hexane, 2,5-dimethyl-2,5-di(tert-butylperoxy)- hexyne, 3,3,5,7,7-pentamethyl 1,2,4-trioxepane; and the like.

Thermoplastic Resins

In one or more embodiments, the thermoplastic resin includes an olefinic thermoplastic resin. The "olefinic thermoplastic resin" can be any material that is not a "rubber" and that is a polymer or polymer blend considered by persons skilled in the art as being thermoplastic in nature, e.g., a polymer that softens when exposed to heat and returns to its original condition when cooled to room temperature. The olefinic thermoplastic resin can contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins can be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. Preferably, the olefinic thermoplastic resin is unvulcanized or non cross-linked.

In one or more embodiments, the olefinic thermoplastic resin contains polypropylene. The term "polypropylene" as used herein broadly means any polymer that is considered a "polypropylene" by persons skilled in the art (as reflected in at least one patent or publication), and includes homo, impact, and random polymers of propylene. Preferably, the polypropylene used in the compositions described herein has a melting point above 110° C., includes at least 90 wt % propylene units, and contains isotactic sequences of those units. The polypropylene can also include atactic sequences or syndiotactic sequences, or both. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ alpha-olefins. The polypropylene can have a high MFR (e.g., from a low of 10, or 15, or 20 g/10 min to a high of 25 to 30 g/10 min. The polypropylene can also have a lower MFR, e.g., "fractional" polypropylenes which have an MFR less than 1.0. Those with high MFR are preferred for ease of processing or compounding.

In one or more embodiments, the olefinic thermoplastic resin is or includes isotactic polypropylene. Preferably, the olefinic thermoplastic resin contains one or more crystalline propylene homopolymers or copolymers of propylene having a melting temperature of from 110° C. to 170° C. or higher as measured by DSC. Preferred copolymers of propylene include, but are not limited to, terpolymers of propylene, impact copolymers of propylene, random polypropylene and mixtures thereof. Preferred comonomers have 2 carbon atoms, or from 4 to 12 carbon atoms. Preferably, the comonomer is ethylene. Such olefinic thermoplastic resins and methods for making the same are described in U.S. Pat. No. 6,342,565.

The term "random polypropylene" as used herein broadly means a single phase copolymer of propylene having up to 9 wt %, preferably from 2 wt % to 8 wt % of an alpha olefin comonomer. Preferred alpha olefin comonomers have 2 carbon atoms, or from 4 to 12 carbon atoms. Preferably, the alpha olefin comonomer is ethylene.

Blending and Additives

In one or more embodiments, the one or more propylene-based polymers and one or more thermoplastic resins can be blended by melt-mixing to form a blend that contains no processing oil. In other words, the blend is processed in the absence of processing oil. Examples of machinery capable of generating the shear and mixing include extruders with kneaders or mixing elements with one or more mixing tips or flights, extruders with one or more screws, extruders of co or counter rotating type, Banbury mixer, Farrell Continuous mixer, and the Buss Kneader. The type and intensity of mixing, temperature, and residence time required can be achieved by the choice of one of the above machines in combination with the selection of kneading or mixing elements, screw design, and screw speed (generally <3000 RPM).

In one or more embodiments, the blend can include the propylene-based polymer in an amount ranging from a low of about 60, 70 or 75 wt % to a high of about 80, 90, 95 wt %. In one or more embodiments, the blend can include the one or more polyolefinic thermoplastic components in an amount ranging from a low of about 5, 10 or 20 wt % to a high of about 25, 30, or 40 wt %.

When the one or more thermoplastic resins are present, the blend can include about 60 wt % to about 95 wt % of the propylene-based polymer and about 5 wt % to about 40 wt % of the one or more thermoplastic resins. In one or more embodiments, the blend can include about 70 wt % to about 95 wt % of the propylene-based polymer and about 5 wt % to about 30 wt % of the one or more thermoplastic resins. In one or more embodiments, the blend can include about 65 wt % to about 80 wt % of the propylene-based polymer and about 20 wt % to about 35 wt % of the one or more thermoplastic resins.

In one or more embodiments, the blend can contain one or more additives, which can be introduced at the same time as the other components, or later downstream in case of using an extruder or Buss kneader, or only later in time. Examples of such additives are antioxidants, antiblocking agents, antistatic agents, ultraviolet stabilizers, foaming agents, and processing aids. Such additives can comprise from about 0.1 to about 10 percent by weight based on the total weight of blend. The additives can be added to the blend in pure form or in master batches.

Fibers

In one or more embodiments, any one of the one or more facing layers and the one or more inner layers can be a multicomponent layer. The term "multicomponent", as used herein, refers to fibers which have been formed from at least two polymers extruded from separate extruders and melt-blown or spun together to form one fiber. Multicomponent fibers are also referred to in the art as bicomponent fibers. The polymers used in multicomponent fibers are typically different from each other; however, conjugated fibers can be monocomponent fibers. The polymers can be arranged in distinct zones across the cross-section of the conjugated fibers and extend continuously along the length of the conjugated fibers. The configuration of conjugated fibers can be, for example, a sheath/inner arrangement wherein one polymer is surrounded by another, a side by side arrangement, a pie arrangement or an "islands-in-the-sea" arrangement. Conjugated fibers are described in U.S. Pat. Nos. 5,108,820; 5,336,552; and 5,382,400; the entire disclosures of which are hereby incorporated herein by reference. In a particular embodiment, the fibers can be part of a conjugated configuration.

In one or more embodiments, the fibers can be in the form of continuous filament yarn, partially oriented yarn, and staple fibers. Continuous filament yarns typically range from 40 denier to 20,000 denier (denier=number of grams per 9000 yards). Filaments currently range from 1 to 20 or more denier per filament (dpf). Spinning speeds are typically 800 m/min to 1500 m/min (2500 ft/min to 5000 ft/min).

Partially oriented yarn (POY) is the fiber produced directly from fiber spinning without solid state drawing, as in the continuous filament. The orientation of the molecules in the fiber is done in the melt state just after the molten polymer leaves the spinneret.

Staple fiber filaments can range, for example, from 1.5 dpf to 70 dpf or more, depending on the application. There are two basic staple fiber fabrication processes: traditional and compact spinning. The traditional process typically involves two steps: 1) producing, applying, finishing, and winding, followed by 2) drawing, a secondary finish application, crimping, and cutting into staple fibers.

Fabrics

Nonwoven fabrics can be made from extruded fibers that have been woven or bonded. The extrusion process to form the extruded fibers can be F accompanied by mechanical or aerodynamic drawing of the fibers. The elastic fabrics described herein can be manufactured by conventional equipment using any technique known in the art. Such methods and equipment are well known. For example, spunbond nonwoven fabrics can be produced by spunbond nonwoven production lines produced by Reifenhauser GmbH & Co., Troisdorf, Germany. The Reifenhauser system utilizes a slot drawing technique as described in U.S. Pat. No. 4,820,142.

The term "nonwoven" as used herein refers to a web or fabric having a structure of individual fibers or threads that are randomly interlaid, but not in any identifiable manner as is the case for a knitted fabric. The elastic fiber can be employed to prepare inventive nonwoven elastic fabrics as well as composite structures comprising the elastic nonwoven fabric in combination with nonelastic materials.

As used herein, the term "thermal bonding" refers to the heating of fibers to effect the melting (or softening) and fusing of fibers such that a nonwoven fabric is produced. Thermal bonding includes calendar bonding and through-air bonding, as well as other methods known in the art.

The inventive nonwovens described herein include melt blown fabrics and spunbonded fabrics. Melt blown fabrics are generally webs of fine filaments having a fiber diameter in the range of from 0.1 to 20 microns. Typical fiber diameters for melt blown fabrics are in the range of from 1 to 10 microns, or from 1 to 5 microns. The nonwoven webs formed by these fine fiber diameters have very small pore sizes and can, therefore, have excellent barrier properties.

For example, in the melt blown process, the extruder melts the polymer and delivers the molten polymer to a metering melt pump. The melt pump delivers the molten polymer at a steady output rate to a special melt blowing die. As the molten polymer exits the die, the polymer is contacted by high temperature, high velocity air (called process or primary air). This air attenuates the polymer melt stream into small fibers that are collected on a forming belt. The fibers are cooled during transport to the belt by ambient air. Auxiliary cooling in the form of a secondary process air at low temperature or water spray can be applied. As such, the fabric formed on the forming belt consists essentially of randomly oriented short fibers.

Spunbond fibers are generally produced, for example, by the extrusion of molten polymer from either a large spinneret having typically approximately 1000 holes per meter length, or with banks of smaller spinnerets, with each spinneret section containing as few as 40 holes. After exiting the spinneret, the molten fibers are quenched by a cross-flow air quench system, then pulled away from the spinneret and attenuated (drawn) by high speed air. Filaments formed in this manner are collected on a screen ("wire") or porous forming belt to form the web. The web is then passed through compaction rolls and then between heated calendar rolls where the raised lands on one roll bond the web at points covering generally from about 10% to about 40% of its area to form a nonwoven fabric. The top calendar roll may have an embossed pattern while the bottom roll is smooth.

In some embodiments, the fabrics can be further processed. For example, the fabric can be subjected to a surface treatment process, such as sizing. Thus, in some embodiments, the fabric can contain sizing additives such as rosins, resins, or waxes. As another example, the fabric can be subjected to a tentering process. In one or more embodiments above, blocking agents can be added to the fabric in a processing step subsequent to the formation of the fabric.

Films

Films can be manufactured by conventional tubular extrusion (blown bubble process) or by cast extrusion. In the cast extrusion process, the molten resin is extruded from an elongate die to the form of a web. The web is cast onto a chill roller, which solidifies the polymer, and finally the web is wound into a roll. The process described above can also include a set of embossing rolls to chill and form the film.

Films can be made with a coextruded soft or thermoplastic layer adhered to one or both sides of the inventive film. The layers are adhered by a process of coextrusion of the film with the layer. In these coextruded films the individual layers are different in composition and retain their composition except at the interface layer. These layers can be either a soft material such as an ethylene-propylene copolymer elastomer which is intended to reduce the adhesive sticky feel of the inventive film, or a thermoplastic. In one embodiment, the thermoplastic layer is used as a mechanical support for the elastic film to prevent sag. In another embodiment, the thermoplastic layer is used as a barrier to adhesion of the polymer film to other surfaces. In another embodiment, the thermoplastic layer becomes a part of the integral use of the elastic film in that the composite film is stretched beyond the yield point of the thermoplastic layer (typically>50% elongation) and allowed to retract due to the elastic forces of the elastic inner film. In this operation thermoplastic film is wrinkled to lead to a desirable surface finish of the composite elastic film. In a particular aspect of this embodiment, the thermoplastic is selected from polypropylene and polyethylene.

The mechanical properties referred to above can be enhanced by mechanical orientation of the polymer film. Mechanical orientation can be done by the temporary, forced extension of the polymer film along one or more axis for a short period of time before it is allowed to relax in the absence of the extensional forces. It is believed that the mechanical orientation of the polymer leads to reorientation of the crystallizable portions of the blend of the first and the second polymer.

Articles

The elastic laminate can be used for a variety of articles including consumer and industrial goods. Illustrative consumer articles and goods include but are not limited to incontinence pads, disposable diapers, training pants, clothing, undergarments, sports apparel, face masks, gowns, and filtration media.

Definitions and Test Methods

For purposes of convenience, various definitions and specific test procedures are identified below. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures may yield different results or measurements. Thus, a person of ordinary skill in the art is to expect experimental variations in measured properties that are reflected in the claims. All numerical values can be considered to be "about" or "approximately" the stated value, in view of the nature of testing in general.

Comonomer content: The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, vol. 47, pp. 1128-1130.

In the particular case of propylene-ethylene copolymers containing greater than 75 wt % propylene, the comonomer content can be measured as follows. A thin homogeneous film is pressed at a temperature of about 150° C. or greater, and mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585−111.987X+30.045X$^2$, where X is the ratio of the peak height at 1155 cm$^{-1}$ and peak height at either 722 cm$^{-1}$ or 732 cm$^{-1}$, whichever is higher.

Polyene content: The amount of polyene present in a polymer can be inferred by the quantitative measure of the amount of the pendant free olefin present in the polymer after polymerization. Several procedures such as iodine number and the determination of the olefin content by H$^1$ or $^{13}$C nuclear magnetic resonance (NMR) have been established. In embodiments described herein where the polyene is ENB, the amount of polyene present in the polymer can be measured using ASTM D3900.

Isotactic: The term "isotactic" is defined herein as a polymer sequence in which greater than 50% of the pairs of pendant methyl groups located on adjacent propylene units, which are inserted into the chain in a regio regular 1,2 fashion and are not part of the backbone structure, are located either above or below the atoms in the backbone chain, when such atoms in the backbone chain are all in one plane. Certain combinations of polymers in blends or polymer sequences within a single polymer are described as having "substantially the same tacticity," which herein means that the two polymers are both isotactic according to the definition above.

Tacticity: The term "tacticity" refers to the stereoregularity of the orientation of the methyl residues from propylene in a polymer. Pairs of methyl residues from contiguous propylene units identically inserted which have the same orientation with respect to the polymer backbone are termed "meso" (m). Those of opposite configuration are termed "racemic" (r). When three adjacent propylene groups have methyl groups with the same orientation, the tacticity of the triad is 'mm'. If two adjacent monomers in a three monomer sequence have the same orientation, and that orientation is different from the relative configuration of the third unit, the tacticity of the triad is 'mr'. When the middle monomer unit has an opposite configuration from either neighbor, the triad has 'rr' tacticity. The fraction of each type of triad in the polymer can be determined and when multiplied by 100 indicates the percentage of that type found in the polymer.

The triad tacticity of the polymers described herein can be determined from a $^{13}$C nuclear magnetic resonance (NMR) spectrum of the polymer as described below and as described in U.S. Pat. No. 5,504,172, the disclosure of which is hereby incorporated herein by reference.

Tacticity Index: The tacticity index, expressed herein as "m/r", is determined by $^{13}$C nuclear magnetic resonance (NMR). The tacticity index m/r is calculated as defined in H. N. Cheng, *Macromolecules*, 17, 1950 (1984). An m/r ratio of 1.0 generally describes a syndiotactic polymer, and an m/r ratio of 2.0 generally describes an atactic material. An isotactic material theoretically can have a ratio approaching infinity, and many by-product atactic polymers have sufficient isotactic content to result in ratios of greater than 50.

Melting point and heat of fusion: The melting point (TM) and heat of fusion of the polymers described herein can be determined by Differential Scanning Calorimetry (DSC), using the ASTM E-794-95 procedure. About 6 to 10 mg of a sheet of the polymer pressed at approximately 200° C. to 230° C. and allowed to cool by hanging in air under ambient conditions, is removed with a punch die and annealed at room temperature for 48 hours. At the end of this period, the sample is placed in a Differential Scanning Calorimeter (Perkin Elmer Pyris 1 Thermal Analysis System) and cooled to about −50° C. to −70° C. The sample is heated at about 20° C./min to attain a final temperature of about 180° C. to 200° C. The term "melting point," as used herein, is the highest peak among principal and secondary melting peaks as determined by DSC, discussed above. The thermal output is recorded as the area under the melting peak of the sample, which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption relative to a baseline measurement within the range of melting of the sample.

Molecular weight and molecular weight distribution: The molecular weight and molecular weight distribution of the polymers described herein can be measured as follows. Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Mz, Mw, and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyrogel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where Ni is the number of molecules having a molecular weight Mi. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., Polymer Molecular Weights Part II, Marcel Dekker, Inc., NY, (1975) 287-368; Rodriguez, F., Principles of Polymer Systems 3$^{rd}$ ed., Hemisphere Pub. Corp., NY, (1989) 155-160; U.S. Pat. No. 4,540,753; Verstrate et al., Macromolecules, vol. 21, (1988) 3360; and references cited therein.

Mooney viscosity: Mooney viscosity, as used herein, is measured as ML(1+4) @ 125° C. according to ASTM D1646.

Melt flow rate and melt index: The determination of the Melt Flow rate (MFR) and the Melt Index of the polymer is according to ASTM D1238 using modification 1 with a load of 2.16 kg. In this version of the method a portion of the sample extruded during the test was collected and weighed. The sample analysis is conducted at 230° C. with a 1 minute preheat on the sample to provide a steady temperature for the duration of the experiment. This data is expressed as dg of sample extruded per minute. In an alternative procedure, the test is conducted in an identical fashion except at a temperature of 190 C. This data is referred to as MI@190 C.

Isotacticity Index: The isotacticity index is calculated according to the procedure described in EP 0374695A2. The IR spectra of a thin film of the material is recorded and the absorbance at 997 cm$^{-1}$ and the absorbance at 973 cm-1 are determined. The quotient of the absorbance at 997 cm$^{-1}$ to the absorbance at 973 cm$^{-1}$ is multiplied by 100 to yield the isotacticity index. In the determination of the absorbance at these two positions the position of zero absorbance is the absorbance when there is no analytical sample present in the sample beam.

EXAMPLES

The foregoing discussion can be further described with reference to the following non-limiting examples. Two elastic laminates (Examples 1 and 2) according to the present invention and three comparative examples (Comp. Ex. 1-3) are provided. Examples 1 and 2 had an elastic inner layer ("layer B") disposed between spunbond elastic facing layers ("layer A"). Comparative examples 1 and 2 were monolithic fabrics of the facing layer alone. Comparative example 3 was a laminate having a highly elastic SBC inner layer. As shown in Table 1 below, Examples 1 and 2 having the elastic inner layer showed significantly improved elasticity compared to non-laminates of the facing layer alone (comparative examples 1 and 2). Also, Examples 1 and 2 exhibited elastic properties similar to that of the highly elastic SBC comparative example 3.

Examples 1 and 2

Examples 1 and 2 were A/B/A laminate structures. Each facing layer ("layer A") is a spunbond nonwoven comprising a propylene-based polymer having a MFR of 80. Polymer 1 or P1 has 60 wt % or more units derived from propylene, isotactically arranged propylene derived sequences, a density of 0.868 g/cm$^3$, and heat of fusion of about 25 J/g. Polymer 2 or P2 has 60 wt % or more units derived from propylene, isotactically arranged propylene derived sequences, a density of 0.865 g/cm$^3$, and a heat of fusion of about 21 J/g. Polymer 2 had a permanent set of 15% after 100% extension, compared to 20% at 100% extension for Polymer 1, based on 65 gsm nonwoven. As such, Polymer 2 showed a higher elasticity compared to Polymer 1.

The facing layer was made in a slot die spunmelt process to a basis weight of 50 gsm. A commercial slot die available from Reifenhauser (Reicofil ®system) was used to make the spunbond fabric. The nonwovens in Layer A were produced in a 1 m wide Reicofil 3 system, at a throughput of around 0.5 grams/hole/min.

The inner layer ("layer B") was a cast elastic film constructed using a propylene-based polymer ("Polymer 3" or "P3") having 60 wt % or more units derived from propylene, isotactically arranged propylene derived sequences, a MFR of 3, a density of 0.860 g/cm$^3$, and heat of fusion of about 10 J/g. Prior to cast film extrusion, the Polymer 3 resin was blended with an antiblock masterbatch at an 80/20 blend ratio of the Polymer 3 resin to masterbatch to eliminate roll blocking. The antiblock masterbatch contained 65 wt % of a propylene-based polymer ("Polymer 4" or "P4") having 60 wt % or more units derived from propylene, isotactically arranged propylene derived sequences, a MFR of 21, density of 0.861 g/cm$^3$, and a heat of fusion of about 16 J/g.; 5 wt % Erucamide; and 30 wt % ABT 2500 (Talc). Polymer 3 and the antiblock masterbatch were tumble blended and converted to cast film with a thickness of 2 mils in a Black Clawson® cast film machine.

Comparative Examples

Comparative examples 1 and 2 ("Comp. Ex. 1" and "Comp. Ex. 2") were each a spunbond monolithic fabric at a basis weight of 100 gsm. The properties of the monolithic fabrics are shown as the root mean square (RMS) values calculated as $((MD^2+TD^2)/2)^{0.5}$.

Comparative example 3 was a polypropylene (PP) nonwoven facing layer that enclosed a styrenic block copolymer (SBC) elastic film. The permanent set after 150% extension was measured as 6.2%. The permanent set at 100%, both As-Is and Prestretch as reported in Table 1, are estimated based on the permanent set after 150% extension.

Lamination & Testing

In Examples 1 and 2, the layers A and B were laminated using standard equipment without the use of any adhesives. The laminates were cut to a dimension of 4 inches in length and 1 inch in width and tested under tension by cycling to a strain level of 100%. The first stretch cycle is denoted as testing under "as is" condition. The samples were cycled a second time with no hold to a strain level of 100%. This condition was denoted as testing under "pre stretch" condition.

From the load-displacement curve, for both the "as is" and "pre stretch" conditions, the following properties were calculated and summarized in Table 1 below.

Permanent Set (%): Strain level corresponding to zero force on return.

Load Loss (%): (Load on Ascending Curve—Load on Descending Curve/(Load on Ascending calculated at the 50% strain level).

Hysteresis (lb-in/in): Area enclosed by the ascending and descending portion of the load displacement curve.

Mechanical Hysteresis (lb-in/in): Area under the ascending portion of the load displacement curve.

Hysteresis (%): Hysteresis/Mechanical Hysteresis

PS: Pre stretch to 100% strain.

TABLE 1

Properties of Composite Laminates

|  | EX. 1 | EX. 2 | Comp Ex. 1 | Comp Ex. 2 | Comp Ex. 3 |
| --- | --- | --- | --- | --- | --- |
| Layer A: | P2 | P1 | P2 | P1 | PP |
| Layer B: | P3 and P4 | P3 and P4 | N/A | N/A | SBC |
| Layer A: | P2 | P1 |  |  | PP |
| Adhesive layer(s) | No | No | No | No | Yes |
| 100% As Is |  |  |  |  |  |
| Permanent Set (%) | 12.3 | 19.9 | 17.1 | 23.5 | est. 6% |
| Load Loss @ 50% Strain (%) | 62.5 | 84.3 | 85.6 | 90.9 |  |
| Hysteresis (lb-in/in) | 0.48 | 1.61 | 1.03 | 1.03 |  |

TABLE 1-continued

Properties of Composite Laminates

|  | EX. 1 | EX. 2 | Comp Ex. 1 | Comp Ex. 2 | Comp Ex. 3 |
|---|---|---|---|---|---|
| Mechanical Hysteresis (%) | 54 | 69.7 | | | |
| 100% Pre Stretch | | | | | |
| Permanent Set (%) | 9.4 | 15.6 | 13.9 | 19.2 | est. 26% |
| Load Loss @ 50% Strain (%) | 45.1 | 71 | 67.0 | 77.1 | |
| Hysteresis (lb-in/in) | 0.29 | 1.04 | 0.29 | 0.25 | |
| Mechanical Hysteresis (%) | 38 | 58.3 | | | |

As shown in Table 1, the permanent set values of the composite laminates are lower than the corresponding monolithic fabrics (1 vs CE 1 and 2 vs CE 2), both in the "as is" and the "pre stretch" conditions. More particularly, the addition of the elastic inner layer in Examples 1 and 2 significantly improved the elasticity of the Polymer 1 or Polymer 2 monolithic facing layers, as manifested in reduction of set, load loss and hysteresis. Moreover, the addition of the elastic inner layer in Examples 1 and 2 provided elasticity performance approaching that of a highly elastic SBC laminate which is represented by Comparative Example 3 ("Comp. Ex. 3"). Surprisingly, Examples 1 and 2 showed significantly improved elasticity without the need for additional adhesives.

Embodiments of the present invention further include:

1. An elastic laminate, comprising:
   one or more facing layers comprising one or more thermoplastic resins and one or more propylene-based polymers, wherein the facing layers each comprise at least 50% by weight of the one or more propylene-based polymers; and
   one or more inner layers comprising one or more propylene-based polymers,
   wherein each propylene-based polymer has (i) 60 wt % or more units derived from propylene, (ii) isotactically arranged propylene derived sequences, and (iii) a heat of fusion less than 45 J/g.

2. The elastic laminate of paragraph 1, wherein the one or more facing layers each comprise at least 80% by weight of the one or more propylene-based polymers.

3. The elastic laminate of paragraphs 1 or 2, wherein the one or more inner layers each comprise at least 1% by weight of the one or more propylene-based polymers.

4. The elastic laminate of any of paragraphs 1 to 3, wherein the one or more inner layers each comprise at least 50% by weight of the one or more propylene-based polymers.

5. The elastic laminate of any of paragraphs 1 to 4, wherein the one or more inner layers each comprise at least 80% by weight of the one or more propylene-based polymers.

6. The elastic laminate of any of paragraphs 1 to 5, wherein the one or more inner layers each comprise at least 99% by weight of the one or more propylene-based polymers.

7. The elastic laminate of any of paragraphs 1 to 6, wherein the one or more facing layers are spunbond and laminated at least partially about the one or more inner layers to form the elastic laminate.

8. An article of manufacture, comprising:
   an elastic laminate having one or more facing layers disposed at least partially about one or more inner layers, wherein the facing layers and inner layers each comprise at least 50% by weight of one or more propylene-based polymers having (i) 60 wt % or more units derived from propylene, (ii) isotactically arranged propylene derived sequences, and (iii) a heat of fusion less than 45 J/g.

9. The article of paragraph 8, wherein the one or more facing layers each comprise at least 80% by weight of the one or more propylene-based polymers.

10. The article of paragraphs 8 or 9, wherein the one or more inner layers each comprise at least at least 1% by weight of the one or more propylene-based polymers.

11. The article of any of paragraphs 8 to 10, wherein the one or more inner layers each comprise at least 50% by weight of the one or more propylene-based polymers.

12. The article of any of paragraphs 8 to 11, wherein the one or more inner layers each comprise at least 80% by weight of the one or more propylene-based polymers.

13. The article of any of paragraphs 8 to 12, wherein the one or more inner layers each comprise at least 99% by weight of the one or more propylene-based polymers.

14. The article of any of paragraphs 8 to 13, wherein the one or more facing layers are spunbond and laminated at least partially about the one or more inner layers to form the elastic laminate.

15. A disposable article comprising the elastic laminate of any of paragraphs 1 to 14.

16. A durable article comprising the elastic laminate of any of paragraphs 1 to 15.

17. An elastic laminate, comprising:
   an inner layer at least partially disposed between two or more facing layers, each layer comprising at least 50% by weight of one or more propylene-based polymers having (i) 60 wt % or more units derived from propylene, (ii) isotactically arranged propylene derived sequences, and (iii) a heat of fusion less than 45 J/g., wherein at least one of the two or more facing layers further comprises one or more one or more thermoplastic resins.

18. The elastic laminate of paragraph 17, wherein the facing layers each comprise at least 80% by weight of the one or more propylene-based polymers.

19. The elastic laminate of paragraphs 17 or 18, wherein the inner layer comprises at least two of the one or more propylene-based polymers.

20. The elastic laminate of any of paragraphs 17 to 19, wherein the inner layer comprises at least 70% by weight of a first propylene-based polymer having a MFR less than about 5 dg/min. and at least 10% by weight of a second propylene-based polymer having a MFR greater than about 20 dg/min.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. An elastic laminate, comprising:
   one or more nonwoven fabric facing layers comprising one or more thermoplastic resins and at least 80% by weight of one or more propylene-based polymers; and
   one or more film inner layers comprising at least 50% by weight of one or more propylene-based polymers, wherein each propylene-based polymer has (i) 60 wt % or more units derived from propylene, (ii) isotactically arranged propylene derived sequences, and (iii) a heat of fusion less than 45 J/g.

2. The elastic laminate of claim 1, wherein the one or more inner layers each comprise at least 80% by weight of the one or more propylene-based polymers.

3. The elastic laminate of claim 1, wherein the one or more inner layers each comprise at least 99% by weight of the one or more propylene-based polymers.

4. The elastic laminate of claim 1, wherein the one or more facing layers are spunbond and laminated at least partially about the one or more inner layers to form the elastic laminate.

5. An article of manufacture, comprising:
   an elastic laminate having one or more nonwoven fabric facing layers disposed at least partially about one or more film inner layers,
   wherein the facing layers and inner layers each comprise at least 50% by weight of one or more propylene-based polymers having (i) 60 wt% or more units derived from propylene, (ii) isotactically arranged propylene derived sequences, and (iii) a heat of fusion less than 45 J/g, and
   wherein the one or more propylene-based polymers of the one or more inner layers have an MFR from about 2 to about 30 dg/min.

6. The article of claim 5, wherein the one or more facing layers each comprise at least 80% by weight of the one or more propylene-based polymers.

7. The article of claim 5, wherein the one or more inner layers each comprise at least at least 1% by weight of the one or more propylene-based polymers.

8. The article of claim 5, wherein the one or more inner layers each comprise at least 50% by weight of the one or more propylene-based polymers.

9. The article of claim 5, wherein the one or more inner layers each comprise at least 80% by weight of the one or more propylene-based polymers.

10. The article of claim 5, wherein the one or more inner layers each comprise at least 99% by weight of the one or more propylene-based polymers.

11. The article of claim 5, wherein the one or more facing layers are spunbond and laminated at least partially about the one or more inner layers to form the elastic laminate.

12. A disposable article comprising the elastic laminate of claim 1.

13. A durable article comprising the elastic laminate of claim 1.

14. An elastic laminate, comprising:
   a film inner layer at least partially disposed between two or more nonwoven fabric facing layers, each layer comprising at least 50% by weight of one or more propylene-based polymers having (i) 60 wt% or more units derived from propylene, (ii) isotactically arranged propylene derived sequences, and (iii) a heat of fusion less than 45 J/g,
   wherein at least one of the two or more facing layers further comprises one or more one or more thermoplastic resins, and
   wherein the one or more propylene-based polymers of the inner layer have an MFR from about 2 to about 30 dg/min.

15. The elastic laminate of claim 14, wherein the facing layers each comprise at least 80% by weight of the one or more propylene-based polymers.

16. The elastic laminate of claim 14, wherein the inner layer comprises at least two of the one or more propylene-based polymers.

17. The elastic laminate of claim 16, wherein the inner layer comprises at least 70% by weight of a first propylene-based polymer having an MFR from about 2 to about 5 dg/min and at least 10% by weight of a second propylene-based polymer having an MFR from about 20 to about 30 dg/min.

18. The elastic laminate of claim 1, wherein the film consists essentially of a propylene-based polymer having an MFR of from 0.5 to 30 g/ 10 min and an antiblocking agent.

19. The elastic laminate of claim 5, wherein the film consists essentially of a propylene-based polymer having an MFR of from 0.5 to 30 g/ 10 min and an antiblocking agent.

20. The elastic laminate of claim 14, wherein the film consists essentially of a propylene-based polymer having an MFR of from 0.5 to 30 g/ 10 min and an antiblocking agent.

* * * * *